US012311689B2

(12) United States Patent
Matsuba et al.

(10) Patent No.: US 12,311,689 B2
(45) Date of Patent: May 27, 2025

(54) THERMAL TRANSFER SHEET

(71) Applicant: Dai Nippon Printing Co., Ltd., Tokyo (JP)

(72) Inventors: Emi Matsuba, Tokyo (JP); Mitsuhiro Oota, Tokyo (JP); Hiroshi Eguchi, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 941 days.

(21) Appl. No.: 17/310,417

(22) PCT Filed: Feb. 6, 2020

(86) PCT No.: PCT/JP2020/004678

§ 371 (c)(1),
(2) Date: Aug. 2, 2021

(87) PCT Pub. No.: WO2020/175082

PCT Pub. Date: Sep. 3, 2020

(65) Prior Publication Data

US 2022/0126619 A1 Apr. 28, 2022

(30) Foreign Application Priority Data

Feb. 26, 2019 (JP) ................................ 2019-033205

(51) Int. Cl.
*B41M 5/42* (2006.01)
*B41M 5/44* (2006.01)

(52) U.S. Cl.
CPC .............. *B41M 5/42* (2013.01); *B41M 5/423* (2013.01); *B41M 5/44* (2013.01);
(Continued)

(58) Field of Classification Search
CPC .......... B41M 5/42; B41M 5/423; B41M 5/44; B41M 2205/06; B41M 2205/30; B41M 2205/38
See application file for complete search history.

(56) References Cited

U.S. PATENT DOCUMENTS 4,840,848 A * 6/1989 Koshizuka ............. B41M 5/395 428/447
4,882,218 A * 11/1989 Koshizuka ............. B41M 5/395 428/207
(Continued)

FOREIGN PATENT DOCUMENTS

JP S63-302090 A 12/1988
JP H01-099884 A 4/1989
(Continued)

OTHER PUBLICATIONS

Machine translation of detailed description of JP 63-302090 acquired on Aug. 19, 2024.*
(Continued)

*Primary Examiner* — Gerard Higgins
(74) *Attorney, Agent, or Firm* — BURR PATENT LAW, PLLC

(57) ABSTRACT

Provided is a thermal transfer sheet with low hot and cold peeling strengths. Thermal transfer sheet according to the present disclosure includes a substrate and a transfer layer, wherein the transfer layer includes at least a peeling layer, and the peeling layer contains a vinyl resin and at least one of an alcohol alkoxylate and an alcohol having 18 to 80 carbon atoms.

9 Claims, 3 Drawing Sheets

(52) U.S. Cl.
CPC ..... *B41M 2205/06* (2013.01); *B41M 2205/30* (2013.01); *B41M 2205/38* (2013.01)

(56) References Cited

U.S. PATENT DOCUMENTS

| | | | | |
|---|---|---|---|---|
| 4,923,749 | A * | 5/1990 | Talvalkar | B41M 5/392 428/483 |
| 5,739,189 | A * | 4/1998 | Lorenz | B41M 5/392 524/424 |
| 2019/0061399 | A1 | 2/2019 | Iwasaki et al. | |
| 2019/0217602 | A1 | 7/2019 | Kaimoto et al. | |

FOREIGN PATENT DOCUMENTS

| | | | |
|---|---|---|---|
| JP | H08-118814 | A | 5/1996 |
| JP | H09-011652 | A | 1/1997 |
| JP | H11-277923 | A | 10/1999 |
| JP | 2002-103829 | A | 4/2002 |
| JP | 2012-091459 | A | 5/2012 |
| JP | 2018-043417 | A | 3/2018 |
| KR | 10-2018-0104750 | A | 9/2018 |
| WO | 2018/061741 | A1 | 4/2018 |

OTHER PUBLICATIONS

International Search Report and Written Opinion (Application No. PCT/JP2020/004678) dated Mar. 31, 2020.
Japanese Office Action (Application No. 2021-501854) dated Mar. 5, 2021 (with English translation).
English translation of the International Preliminary Report on Patentability (Chapter I) dated Sep. 10, 2021 (Application No. PCT/JP2020/004678).
Taiwanese Office Action (with English translation) dated May 9, 2022 (Application No. 109105966).
Korean Office Action (Application No. 10-2021-7028507) dated Apr. 17, 2024 (with English translation) (9 pages).
Chinese Office Action dated Dec. 16, 2022 (Application No. 202080007204.1).

* cited by examiner

THERMAL TRANSFER SHEET

TECHNICAL FIELD

The present disclosure relates to a thermal transfer sheet.

BACKGROUND ART

In a known thermofusible transfer method, energy is applied to a thermal transfer sheet including a substrate and a transfer layer using a thermal head or the like to transfer the transfer layer onto a transfer-receiving article, such as a paper or plastic sheet, and form an image or a protective layer.

Images formed by the thermofusible transfer method have high density and sharpness. Thus, the method is suitable for recording binary images, such as characters and line drawings. Variable information, such as addresses, customer information, numbers, and bar codes, can be recorded on transfer-receiving articles by the thermofusible transfer method.

In one embodiment of a known thermofusible transfer method, an image is formed on a thermal transfer sheet that has a transfer layer including a receiving layer (what is called an intermediate transfer medium), and then the transfer layer is transferred onto a transfer-receiving article.

The transfer layer in the thermal transfer sheet is of a hot peeling-type designed to be separated immediately after heating or a cold peeling-type designed to be separated after a certain period following heating, and these types are appropriately selected according to the type of printer to be used.

For example, a thermal transfer sheet including a transfer layer of the hot peeling-type is proposed in Japanese Unexamined Patent Application Publication No. 11-277923 (PTL 1).

A thermal transfer sheet including a transfer layer of the cold peeling-type is proposed in Japanese Unexamined Patent Application Publication No. 2002-103829 (PTL 2).

From the perspective of cost reduction, however, it is not preferable to use a thermal transfer sheet including a transfer layer of the hot peeling-type and a thermal transfer sheet including a transfer layer of the cold peeling-type for different purposes. Thus, there is a demand for a thermal transfer sheet with low peeling strength immediately after heating (hereinafter referred to as hot peeling strength) and with low peeling strength after a certain period following heating (hereinafter referred to as cold peeling strength).

CITATION LIST

Patent Literature

Patent Literature 1: JP 1999-277923 A
Patent Literature 2: JP 2002-103829 A

SUMMARY OF INVENTION

Technical Problem

It is an object of the present disclosure to provide a thermal transfer sheet with low hot and cold peeling strengths.

Solution to Problem

A thermal transfer sheet according to the present disclosure includes a substrate and a transfer layer, wherein the transfer layer includes at least a peeling layer, and the peeling layer contains a vinyl resin and at least one of an alcohol alkoxylate and an alcohol having 18 to 80 carbon atoms.

Advantageous Effects of Invention

The present disclosure can provide a thermal transfer sheet with low hot and cold peeling strengths.

DESCRIPTION OF EMBODIMENTS

Thermal Transfer Sheet

Figure 1:
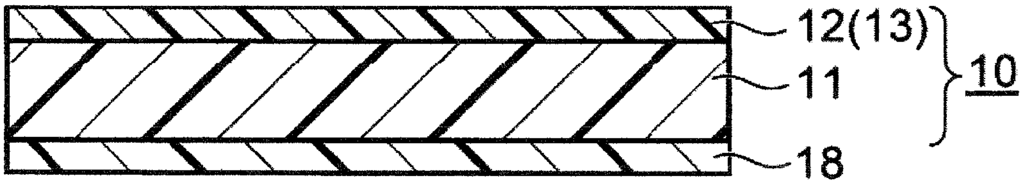
FIG. 1 is a schematic cross-sectional view of an embodiment of a thermal transfer sheet according to the present disclosure.

As illustrated in FIG. 1, a thermal transfer sheet 10 according to the present disclosure includes a substrate 11 and a transfer layer 13 including at least a peeling layer 12.

Figure 2:
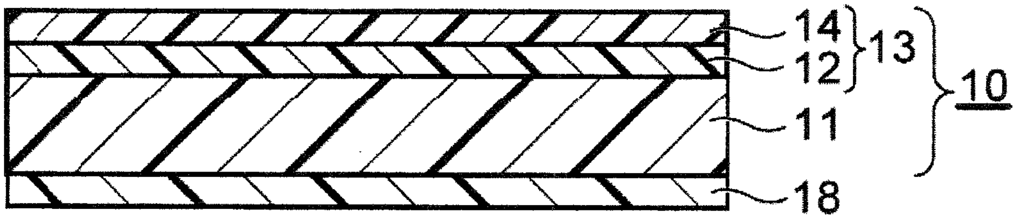
FIG. 2 is a schematic cross-sectional view of an embodiment of the thermal transfer sheet according to the present disclosure.
Figure 3:
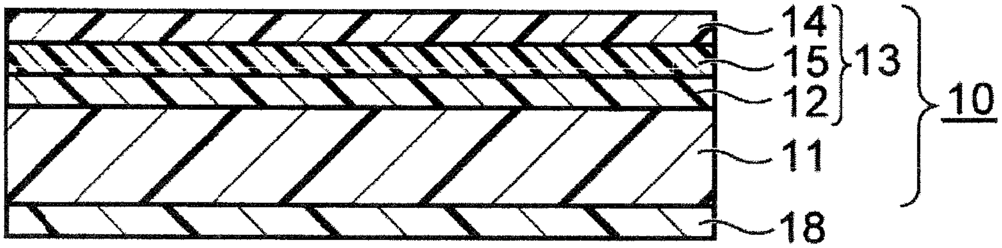
FIG. 3 is a schematic cross-sectional view of an embodiment of the thermal transfer sheet according to the present disclosure.

In one embodiment, as illustrated in FIG. 2, the transfer layer 13 includes a coloring layer 14 on the peeling layer 12. In one embodiment, as illustrated in FIG. 3, the transfer layer 13 includes a protective layer 15 between the peeling layer 12 and the coloring layer 14.

Figure 4:
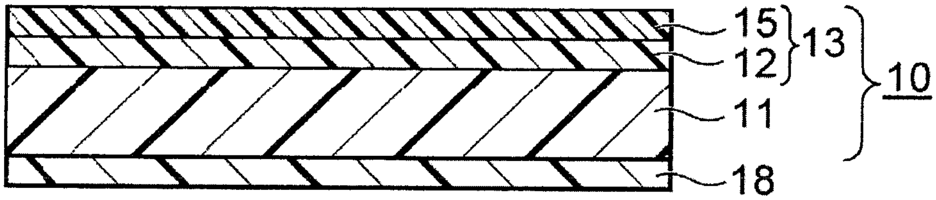
FIG. 4 is a schematic cross-sectional view of an embodiment of the thermal transfer sheet according to the present disclosure.

In one embodiment, as illustrated in FIG. 4, the transfer layer 13 includes the protective layer 15 on the peeling layer 12.

Figure 5:
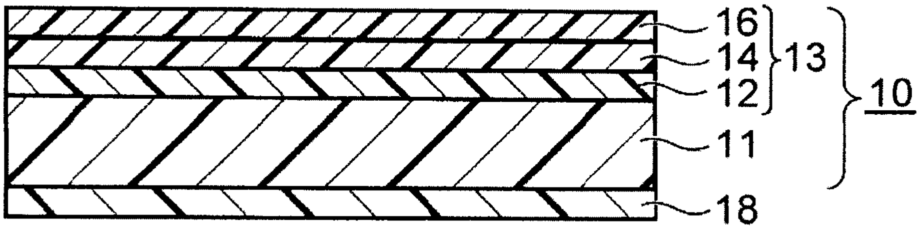
FIG. 5 is a schematic cross-sectional view of an embodiment of the thermal transfer sheet according to the present disclosure.

In one embodiment, as illustrated in FIG. 5, the transfer layer 13 includes an adhesive layer 16 on the outermost side.

Figure 6:
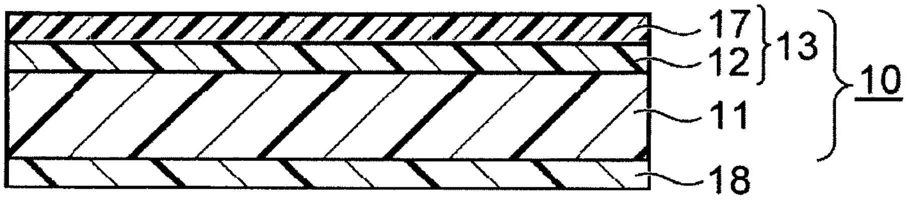
FIG. 6 is a schematic cross-sectional view of an embodiment of the thermal transfer sheet according to the present disclosure.
Figure 7:
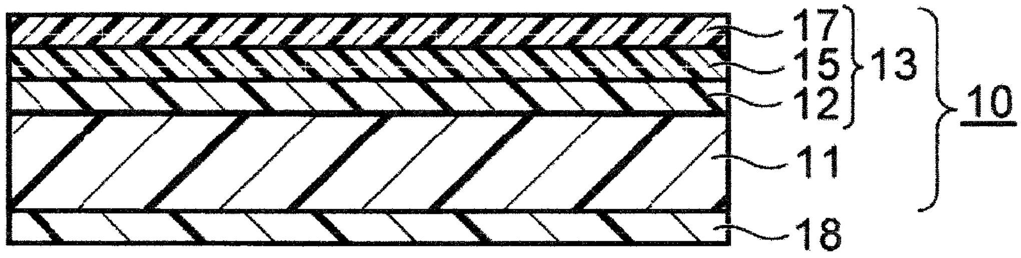
FIG. 7 is a schematic cross-sectional view of an embodiment of the thermal transfer sheet according to the present disclosure.

In one embodiment, as illustrated in FIG. 6, the transfer layer 13 includes a receiving layer 17 on the peeling layer 12. As illustrated in FIG. 7, the transfer layer 13 includes the protective layer 15 between the peeling layer 12 and the receiving layer 17.

In one embodiment, as illustrated in FIGS. 1 to 7, the thermal transfer sheet 10 includes a back layer 18 on an opposite surface of the substrate 11 from the transfer layer 13.

In one embodiment, the thermal transfer sheet 10 according to the present disclosure may further include a release layer or a primer layer (not shown) on the substrate.

Each layer of the thermal transfer sheet according to the present disclosure is described below.

Substrate

Any substrate can be used that has heat resistance to thermal energy applied during thermal transfer and that has mechanical strength and solvent resistance to support a transfer layer or the like on the substrate.

The substrate may be a film formed of a resin material (hereinafter referred to simply as a "resin film"). Examples of the resin material include polyesters, such as poly(ethylene terephthalate) (PET), poly(butylene terephthalate) (PBT), poly(ethylene naphthalate) (PEN), Poly(1,4-cyclohexylenedimethylene terephthalate), and terephthalic acid-cyclohexanedimethanol-ethylene glycol copolymers; polyamides, such as nylon 6 and nylon 6,6; polyolefins, such as polyethylene (PE), polypropylene (PP), and polymethylpentene; vinyl resins, such as poly(vinyl chloride), poly(vinyl alcohol) (PVA), poly(vinyl acetate), vinyl chloride-vinyl acetate copolymers, poly(vinyl butyral), and polyvinylpyrrolidone (PVP); (meth)acrylic resins, such as polyacrylates and polymethacrylates; imide resins, such as polyimides and polyetherimides; cellulose resins, such as cellophane, cellulose acetate, nitrocellulose, cellulose acetate propionate (CAP), and cellulose acetate butyrate (CAB); styrene resins, such as polystyrene (PS); polycarbonates; and ionomer resins.

Among these resin materials, in terms of heat resistance and mechanical strength, polyesters are preferred, PET or PEN is more preferred, and PET is particularly preferred.

In the present disclosure, "(meth)acrylic" includes both "acrylic" and "methacrylic". "(Meth)acrylate" also includes both "acrylate" and "methacrylate".

A laminate of the resin films can also be used as the substrate. The laminate of the resin films can be formed by a dry lamination method, a wet lamination method, or an extrusion method.

When the substrate is a resin film, the resin film may be a stretched film or an unstretched film. In terms of strength, a uniaxially or biaxially stretched film is preferred.

The substrate preferably has a thickness in the range of 2 to 25 μm, more preferably 3 to 16 μm. This can improve the mechanical strength of the substrate and thermal energy transfer during thermal transfer.

Transfer Layer

The thermal transfer sheet according to the present disclosure includes a transfer layer, and the transfer layer includes at least a peeling layer.

In one embodiment, the transfer layer includes a coloring layer on the peeling layer.

In one embodiment, the transfer layer includes a protective layer on the peeling layer. If the transfer layer includes the coloring layer and the protective layer, the protective layer is formed between the peeling layer and the coloring layer. If the transfer layer includes a receiving layer and the protective layer, the protective layer is formed between the peeling layer and the receiving layer.

In one embodiment, the transfer layer includes an adhesive layer on the outermost side.

In one embodiment, the transfer layer includes a receiving layer on the peeling layer.

Peeling Layer

The peeling layer contains a vinyl resin and at least one of an alcohol alkoxylate and an alcohol having 18 to 80 carbon atoms. This can decrease the hot and cold peeling strengths of the thermal transfer sheet.

In the present disclosure, the vinyl resin may be poly(vinyl chloride), poly(vinyl acetate), a vinyl chloride-vinyl acetate copolymer, polyvinylpyrrolidone, or the like.

In the peeling layer of the thermal transfer sheet according to the present disclosure, poly(vinyl alcohol) is not a vinyl resin. Among these, a vinyl chloride-vinyl acetate copolymer is preferred. The use of a vinyl chloride-vinyl acetate copolymer can decrease the hot and cold peeling strengths of the thermal transfer sheet.

In the present disclosure, the vinyl chloride-vinyl acetate copolymer refers to a copolymer of vinyl chloride and vinyl acetate.

The vinyl chloride-vinyl acetate copolymer may contain a compound other than vinyl chloride and vinyl acetate as a copolymerization component. Structural units derived from the other compound in the vinyl chloride-vinyl acetate copolymer preferably constitute 10% or less by mass, more preferably 5% or less by mass, still more preferably 3% or less by mass.

The amount of vinyl resin in the peeling layer preferably ranges from 40% to 99% by mass, more preferably 50% to 95% by mass. This can decrease the hot and cold peeling strengths of the thermal transfer sheet. This can also improve the adhesion between the peeling layer and the substrate of the thermal transfer sheet.

Furthermore, after the transfer layer of the thermal transfer sheet according to the present disclosure is transferred to an intermediate transfer medium transfer layer of an intermediate transfer medium, this can also improve transferability when the transfer layer and the intermediate transfer medium transfer layer are transferred to a transfer-receiving article (hereinafter referred to as retransferability).

Furthermore, this can also improve the adhesion between the transfer-receiving article and the peeling layer of the transfer layer and improve the durability of a printed material.

The alcohol alkoxylate may be an alcohol methoxylate, alcohol ethoxylate, alcohol propoxylate, or alcohol butoxylate. Among these, an alcohol ethoxylate or alcohol butoxylate is preferred, and an alcohol ethoxylate is more preferred. The use of these can further decrease the hot and cold peeling strengths of the thermal transfer sheet.

Among alcohol ethoxylates, alcohol ethoxylates represented by the following general formula (1) are particularly preferred. These can further decrease the hot and cold peeling strengths of the thermal transfer sheet.

$$C_mH_{2m+1}\text{—O—}(CH_2CH_2O)_n\text{—H} \quad (1)$$

In the general formula (1), m denotes an integer in the range of 20 to 60. In terms of hot peeling strength, cold peeling strength, and thin line printability, m preferably denotes an integer in the range of 23 to 55, more preferably 30 to 53.

In the general formula (1), n denotes an integer in the range of 2 to 100. In terms of hot peeling strength, cold peeling strength, and thin line printability, n preferably denotes an integer in the range of 2 to 90, more preferably 3 to 50, still more preferably 3 to 7.

In the general formula (1), the ratio (n/m) of n to m is 3.0 or less. In terms of hot peeling strength, cold peeling strength, and thin line printability, n/m preferably ranges from 0.01 to 2.5, more preferably 0.03 to 0.3.

The amount of alcohol alkoxylate in the peeling layer preferably ranges from 1% to 45% by mass, more preferably 2% to 30% by mass, still more preferably 3% to 25% by mass. This can further decrease the hot and cold peeling strengths and further improve the thin line printability. This can also improve adhesion to the substrate, retransferability, and the durability of a printed material.

The peeling layer contains an alcohol having 18 to 80 carbon atoms. In terms of the cold peeling strength of the thermal transfer sheet, the number of carbon atoms in the alcohol preferably ranges from 20 to 30.

The alcohol having 18 to 80 carbon atoms may be linear or branched. The alcohol having 18 to 80 carbon atoms may be an aliphatic alcohol, an alicyclic alcohol, or an aromatic alcohol.

Among these, a linear aliphatic alcohol is preferred. This can further decrease the hot and cold peeling strengths.

The amount of alcohol having 18 to 80 carbon atoms in the peeling layer preferably ranges from 1% to 45% by mass, more preferably 2% to 30% by mass, still more preferably 3% to 25% by mass. This can further decrease the hot and cold peeling strengths and further improve the thin line printability. This can also improve adhesion to the substrate, retransferability, and the durability of a printed material.

The ratio (A/B) of the amount (A) of vinyl resin in the peeling layer to the sum (B) of the amount of alcohol alkoxylate and the amount of alcohol having 18 to 80 carbon atoms in the peeling layer preferably ranges from 60/40 to 99.5/0.5, more preferably 80/20 to 95/5, based on mass.

The peeling layer may contain a resin material other than the vinyl resins, for example, a (meth)acrylic resin, an epoxy resin, a cellulose resin, a polyurethane, a polyolefin, or a polyester.

The peeling layer may contain an additive agent, for example, a filler, a plasticizing material, an antistatic material, an ultraviolet absorbing material, inorganic particles, organic particles, a release material, and/or a dispersing material.

The peeling layer preferably has a thickness in the range of 0.1 to 2 μm, more preferably 0.5 to 1.3 μm. This can further decrease the hot and cold peeling strengths and further improve the thin line printability. This can also improve adhesion to the substrate, retransferability, and the durability of a printed material.

The peeling layer can be formed by dispersing or dissolving the above materials in water or an appropriate solvent to prepare a coating liquid, applying the coating liquid to a substrate or the like to form a coating film, and drying the coating film. The application method may be a known method, such as a roll coating method, a reverse roll coating method, a gravure coating method, a reverse gravure coating method, a bar coating method, or a rod coating method.

Coloring Layer

A coloring material in the coloring layer can be appropriately selected from carbon black, inorganic pigments, organic pigments, and dyes according to the required color tone or the like.

For example, for bar code printing, it is preferable to have a particularly sufficient black density and not to be discolored or faded by light, heat, or the like. Such a coloring material may be, for example, carbon black, such as lampblack, graphite, or a nigrosine dye. For color printing, another chromatic dye or pigment is used.

Furthermore, titanium oxide, zinc oxide, iron oxide, iron yellow, ultramarine blue, a hologram powder, an aluminum powder, a metallic pigment, a pearl pigment, or the like can be used.

The amount of coloring material in the coloring layer preferably ranges from 25% to 95% by mass, more preferably 30% to 95% by mass. This can improve the image density on a transfer-receiving article.

In one embodiment, the coloring layer contains the above resin material. The coloring layer may contain the above additive material.

The coloring layer preferably has a thickness in the range of 0.3 to 6 μm, more preferably 0.4 to 4 μm. This can improve the image density on a transfer-receiving article.

The coloring layer can be formed by dispersing or dissolving the above materials in water or an appropriate solvent to prepare a coating liquid, applying the coating liquid to a peeling layer or the like by the above application method to form a coating film, and drying the coating film.

Protective Layer

In one embodiment, the protective layer contains a resin material, such as a (meth)acrylic resin, a polyester, a cellulose resin, a polystyrene, a polyamide, a poly(vinyl acetal), a polycarbonate, a thermosetting resin, or an active light curing resin.

The protective layer may contain the above additive material.

The protective layer may have any thickness, for example, in the range of 0.1 to 50 μm.

The protective layer can be formed by dispersing or dissolving the above materials in water or an appropriate solvent to prepare a coating liquid, applying the coating liquid to a peeling layer or the like by the above application method to form a coating film, and drying the coating film.

Adhesive Layer

In one embodiment, the adhesive layer contains at least one thermoplastic resin that softens and exhibits adhesiveness upon heating.

The thermoplastic resin may be, for example, a polyester, a vinyl resin, a (meth)acrylic resin, a polyurethane, a cellulose resin, a polyamide, a polyolefin, a polystyrene, or a chlorinated resin thereof.

The adhesive layer may contain the above additive material.

The adhesive layer has a thickness in the range of, for example, 0.1 to 0.8 μm.

The adhesive layer can be formed by dispersing or dissolving the above materials in water or an appropriate solvent to prepare a coating liquid, applying the coating liquid to a coloring layer or the like by the above application method to form a coating film, and drying the coating film.

Receiving Layer

The receiving layer is a layer that receives a sublimation dye from a dye layer of a sublimation thermal transfer sheet and maintains a formed image.

The receiving layer contains a resin material, for example, a polyolefin, such as polypropylene, a halogenated resin, such as poly(vinyl chloride) or poly(vinylidene chloride), a vinyl resin, such as poly(vinyl acetate), a vinyl chloride-vinyl acetate copolymer, an ethylene-vinyl acetate copolymer, or a polyacrylate, a polyester, such as poly(ethylene terephthalate) or poly(butylene terephthalate), an acrylic-styrene resin, a polystyrene, a polyamide, a copolymer of an olefin (ethylene, propylene, etc.) and another vinyl monomer, an ionomer, a cellulose resin, such as cellulose diastase, or a polycarbonate. Among these, poly(vinyl chloride), an acryl-styrene resin, or a polyester is preferred.

In one embodiment, the receiving layer contains a release material. This can improve releasability from the sublimation thermal transfer sheet.

The release material may be, for example, a solid wax, such as a polyethylene wax, a polyamide wax, or a Teflon (registered trademark) powder, a fluorinated or phosphate ester surfactant, a silicone oil, a modified silicone oil, such as a reactive silicone oil or a curable silicone oil, or a silicone resin.

The silicone oil is preferably a modified silicone oil. The modified silicone oil may be an amino-modified silicone, an epoxy-modified silicone, an aralkyl-modified silicone, an epoxy-aralkyl-modified silicone, an alcohol-modified silicone, a vinyl-modified silicone, a urethane-modified silicone, or the like. Among these, an epoxy-modified silicone, an aralkyl-modified silicone, or an epoxy-aralkyl-modified silicone is particularly preferred.

The receiving layer may contain the above additive material.

The receiving layer may have any thickness, for example, in the range of 0.5 to 20 μm.

The receiving layer can be formed by dispersing or dissolving the above materials in water or an appropriate solvent to prepare a coating liquid, applying the coating liquid to a peeling layer or the like by the above application method to form a coating film, and drying the coating film.

Back Layer

In one embodiment, the thermal transfer sheet according to the present disclosure includes a back layer on a surface of the substrate on which the transfer layer is not formed. This can reduce the occurrence of sticking, wrinkles, and the like due to heating during thermal transfer.

In one embodiment, the back layer contains a resin material. The resin material may be, for example, a cellulose resin, a styrene resin, a vinyl resin, a polyester, a polyurethane, a silicone-modified polyurethane, a fluorine-modified polyurethane, or a (meth)acrylic resin.

In one embodiment, the back layer contains, as a resin material, a two-component curable resin that is cured with an isocyanate compound or the like. Such a resin may be a poly(vinyl acetal), such as poly(vinyl acetoacetal) or poly (vinyl butyral), or the like.

In one embodiment, the back layer contains inorganic or organic particles. This can further reduce the occurrence of sticking, wrinkles, and the like due to heating during thermal transfer.

The inorganic particles may be, for example, a clay mineral, such as talc or kaolin, a carbonate, such as calcium carbonate or magnesium carbonate, a hydroxide, such as aluminum hydroxide or magnesium hydroxide, a sulfate, such as calcium sulfate, an oxide, such as silica, graphite, niter, or boron nitride.

The organic particles may be organic resin particles formed of a (meth)acrylic resin, a Teflon (registered trademark) resin, a silicone resin, a lauroyl resin, a phenolic resin, an acetal resin, a styrene resin, a polyamide, or the like, cross-linked resin particles formed by reacting one of these resins with a cross-linking material, or the like.

The back layer preferably has a thickness in the range of 0.1 to 2 μm, more preferably 0.1 to 1 μm. This can reduce the occurrence of sticking, wrinkles, and the like while maintaining thermal energy transfer during thermal transfer.

The back layer can be formed by dispersing or dissolving the above materials in water or an appropriate solvent to prepare a coating liquid, applying the coating liquid to the substrate by the above application method to form a coating film, and drying the coating film.

Release Layer

In one embodiment, the thermal transfer sheet according to the present disclosure includes a release layer between the substrate and the transfer layer. This can improve the transferability of the thermal transfer sheet.

In one embodiment, the release layer contains a resin material. The resin material may be, for example, a (meth) acrylic resin, a polyurethane, a polyamide, a polyester, a melamine resin, a polyol resin, a cellulose resin, or a silicone resin.

In one embodiment, the release layer contains a release material, such as a silicone oil, a phosphate ester plasticizer, a fluorinated compound, a wax, a metallic soap, or a filler.

The release layer has a thickness in the range of 0.2 to 2 μm, for example.

The release layer can be formed by dispersing or dissolving the above materials in water or an appropriate solvent to prepare a coating liquid, applying the coating liquid to the substrate or the like by the above application method to form a coating film, and drying the coating film.

Primer Layer

In one embodiment, the thermal transfer sheet according to the present disclosure includes a primer layer on one or both surfaces of the substrate. This can improve the adhesion between the substrate and an adjacent layer.

In one embodiment, the primer layer contains a resin material, such as a polyester, a vinyl resin, a polyurethane, a (meth)acrylic resin, a polyamide, an ether resin, or a cellulose resin.

The primer layer has a thickness in the range of 0.2 to 2 μm, for example.

The primer layer can be formed by dispersing or dissolving the above materials in water or an appropriate solvent to prepare a coating liquid, applying the coating liquid to the substrate by the above application method to form a coating film, and drying the coating film.

EXAMPLES

Although the present disclosure is further described in the following examples, the present disclosure is not limited to these examples.

Example 1

A coating liquid with the following composition for forming a peeling layer was applied to one surface of a PET film with a thickness of 4.5 μm and was dried to form a peeling layer with a thickness of 0.75 μm.

Coating Liquid for Forming Peeling Layer

| | |
|---|---|
| Vinyl chloride-vinyl acetate copolymer A (manufactured by Nissin Chemical Industry Co., Ltd., Solbin (registered trademark) CNL, described as vinyl chloride-vinyl acetate in the table) | 70 parts by mass |
| Alcohol alkoxylate a (an alcohol ethoxylate satisfying the general formula (1) (hereinafter referred to as AE), m = 25, n = 8) | 30 parts by mass |

-continued

| | |
|---|---|
| Methyl ethyl ketone (MEK) | 80 parts by mass |
| Normal propyl acetate (NPAC) | 20 parts by mass |

A coating liquid with the following composition for forming a coloring layer was applied to the peeling layer thus formed and was dried to form a coloring layer with a thickness of 1 μm. The peeling layer and the coloring layer are referred to as a transfer layer.

Coating Liquid for Forming Coloring Layer

| | |
|---|---|
| Carbon black | 40 parts by mass |
| Vinyl chloride-vinyl acetate copolymer A | 60 parts by mass |
| Toluene | 100 parts by mass |
| MEK | 100 parts by mass |

A coating liquid with the following composition for forming a back layer was applied to the other surface of the PET film and was dried to form a back layer with a thickness of 0.3 μm. Thus, a thermal transfer sheet was formed.

Coating Liquid for Back Layer

| | |
|---|---|
| Poly(vinyl butyral)<br>(manufactured by Sekisui Chemical Co., Ltd., S-Lec (registered trademark) BX-1) | 2.0 parts by mass |
| Polyisocyanate<br>(manufactured by DIG Corporation, Burnock (registered trademark) D750) | 9.2 parts by mass |
| Phosphate ester surfactant<br>(manufactured by Dai-ichi Kogyo Seiyaku Co., Ltd., Plysurf (registered trademark) A208N) | 1.3 parts by mass |
| Talc<br>(manufactured by Nippon Talc Co., Ltd., Micro Ace (registered trademark) P-3) | 0.3 parts by mass |
| Toluene | 43.6 parts by mass |
| MEK | 43.6 parts by mass |

Examples 2 to 35 and Comparative Examples 1 to 9

Thermal transfer sheets were formed in the same manner as in Example 1 except that the structure and thickness of the peeling layer were changed as shown in Tables 1 and 2.

The components in Tables 1 and 2 are described in detail below.

AEb: m=25, n=32, n/m=1.28
AEc: m=33, n=3, n/m=0.09
AEd: m=33, n=10, n/m=0.3
AEe: m=33, n=42, n/m=1.27
AEf: m=33, n=94, n/m=2.85
AEg: m=40, n=3, n/m=0.08
AEh: m=40, n=13, n/m=0.33
AEi: m=40, n=4, n/m=0.1
AEj: m=50, n=16, n/m=0.32

Alcohol a: the number of carbon atoms 20, linear aliphatic alcohol

Alcohol b: the number of carbon atoms 40, linear aliphatic alcohol

Alcohol c: the number of carbon atoms 60, linear aliphatic alcohol

Alcohol d: the number of carbon atoms 16, linear aliphatic alcohol

Polyester: manufactured by Toyobo Co., Ltd., Vylon (registered trademark) 600

(Meth)acrylic resin: manufactured by Mitsubishi Chemical Corporation, Dianal (registered trademark) BR-83

Glyceryl monostearate: manufactured by Kao Corporation

Example 33

A thermal transfer sheet was formed in the same manner as in Example 16 except that the composition of the coating liquid for forming a coloring layer was changed as described below to form a coloring layer with a thickness of 3 μm.

Coating Liquid for Forming Coloring Layer

| | | |
|---|---|---|
| Titanium oxide 89 parts by mass<br>(manufactured by Ishihara Sangyo Kaisha, Ltd., R-780) | | |
| (Meth)acrylic resin<br>(manufactured by Mitsubishi Chemical Corporation, Dianal (registered trademark) BR-87) | 10 | parts by mass |
| Vinyl chloride-vinyl acetate copolymer<br>(manufactured by Nissin Chemical Industry Co., Ltd., Solbin (registered trademark) CNL) | 0.99 | parts by mass |
| Polyester<br>(manufactured by Toyobo Co., Ltd., Vylon (registered trademark) 200) | 0.01 | parts by mass |
| Toluene | 100 | parts by mass |
| MEK | 100 | parts by mass |

Example 34

A thermal transfer sheet was formed in the same manner as in Example 16 except that the composition of the coating liquid for forming a coloring layer was changed as described below to form a coloring layer with a thickness of 2 μm.

Coating Liquid for Forming Coloring Layer

| | |
|---|---|
| Pearl pigment<br>(Nihon Koken Kogyo Co., Ltd., Twincle Pearl (registered trademark) RXC-SO) | 30 parts by mass |
| Vinyl chloride-vinyl acetate copolymer<br>(manufactured by Nissin Chemical Industry Co., Ltd., Solbin (registered trademark) CNL) | 30 parts by mass |
| Toluene | 100 parts by mass |
| MEK | 100 parts by mass |

Example 35

A thermal transfer sheet was formed in the same manner as in Example 16 except that the composition of the coating liquid for forming a coloring layer was changed as described below to form a coloring layer with a thickness of 2 μm.

Coating Liquid for Forming Coloring Layer

| | |
|---|---|
| Aluminum pigment<br>(manufactured by Asahi Kasei Metals Corporation, non-leafing 8NL-S) | 30 parts by mass |
| Vinyl chloride-vinyl acetate copolymer<br>(manufactured by Nissin Chemical Industry Co., Ltd., Solbin (registered trademark) CNL) | 30 parts by mass |
| Toluene | 100 parts by mass |
| MEK | 100 parts by mass |

TABLE 1

| | Composition of peeling layer (mass %) | | | | | | | | | | |
|---|---|---|---|---|---|---|---|---|---|---|---|
| | Vinyl chloride-vinyl acetate | Polyester | (Meth) acrylic | AEa (m = 25, n = 8) | AEb (m = 25, n = 32) | AEc (m = 33, n = 3) | AEd (m = 33, n = 10) | AEe (m = 33, n = 42) | AEf (m = 33, n = 94) | AEg (m = 40, n = 3) | AEh (m = 40, n = 13) |
| Example 1 | 70 | | | 30 | | | | | | | |
| Example 2 | 70 | | | | 30 | | | | | | |
| Example 3 | 70 | | | | | 30 | | | | | |
| Example 4 | 70 | | | | | | 30 | | | | |
| Example 5 | 70 | | | | | | | 30 | | | |
| Example 6 | 70 | | | | | | | | 30 | | |
| Example 7 | 70 | | | | | | | | | 30 | |
| Example 8 | 70 | | | | | | | | | | 30 |
| Example 9 | 70 | | | | | | | | | | |
| Example 10 | 70 | | | | | | | | | | |
| Example 11 | 70 | | | | | | | | | | |
| Example 12 | 85 | | | | | 15 | | | | | |
| Example 13 | 85 | | | | | | | | | 15 | |
| Example 14 | 85 | | | | | | | | | | |
| Example 15 | 85 | | | | | | | | | | |
| Example 16 | 95 | | | 5 | | | | | | | |
| Example 17 | 95 | | | | 5 | | | | | | |
| Example 18 | 95 | | | | | 5 | | | | | |
| Example 19 | 95 | | | | | | 5 | | | | |
| Example 20 | 95 | | | | | | | 5 | | | |
| Example 21 | 95 | | | | | | | | 5 | | |
| Example 22 | 95 | | | | | | | | | 5 | |
| Example 23 | 95 | | | | | | | | | | 5 |
| Example 24 | 95 | | | | | | | | | | |
| Example 25 | 95 | | | | | | | | | | |
| Example 26 | 85 | | | | | | | | | | |

TABLE 1-continued

| | | | |
|---|---|---|---|
| Example 27 | 99 | | 1 |
| Example 28 | 85 | | |
| Example 29 | 85 | | |
| Example 30 | 85 | | 15 |
| Example 31 | 85 | | 15 |
| Example 32 | 90 | 5 | |
| Example 33 | 95 | 5 | |
| Example 34 | 95 | 5 | |
| Example 35 | 95 | 5 | |

| | Composition of peeling layer (mass %) | | | | | | | Thickness |
|---|---|---|---|---|---|---|---|---|
| | AEi (m = 50, n = 4) | AEj (m = 50, n = 16) | Alcohol a (number of carbons 20) | Alcohol b (number of carbons 40) | Alcohol c (number of carbons 60) | Alcohol d (number of carbons 16) | Glyceryl mono stearate | of peeling layer (μm) |
| Example 1 | | | | | | | | 0.75 |
| Example 2 | | | | | | | | 0.75 |
| Example 3 | | | | | | | | 0.75 |
| Example 4 | | | | | | | | 0.75 |
| Example 5 | | | | | | | | 0.75 |
| Example 6 | | | | | | | | 0.75 |
| Example 7 | | | | | | | | 0.75 |
| Example 8 | | | | | | | | 0.75 |
| Example 9 | 30 | | | | | | | 0.75 |
| Example 10 | | 30 | | | | | | 0.75 |
| Example 11 | | | 30 | | | | | 0.75 |
| Example 12 | | | | | | | | 0.75 |
| Example 13 | | | | | | | | 0.75 |
| Example 14 | 15 | | | | | | | 0.75 |
| Example 15 | | | 15 | | | | | 0.75 |
| Example 16 | | | | | | | | 0.75 |
| Example 17 | | | | | | | | 0.75 |
| Example 18 | | | | | | | | 0.75 |
| Example 19 | | | | | | | | 0.75 |
| Example 20 | | | | | | | | 0.75 |
| Example 21 | | | | | | | | 0.75 |
| Example 22 | | | | | | | | 0.75 |
| Example 23 | | | | | | | | 0.75 |
| Example 24 | 5 | | | | | | | 0.75 |
| Example 25 | | 5 | | | | | | 0.75 |
| Example 26 | | | 5 | | | | | 0.75 |
| Example 27 | | | | | | | | 0.75 |
| Example 28 | | | | 15 | | | | 0.75 |
| Example 29 | | | | | 15 | | | 0.75 |
| Example 30 | | | | | | | | 0.5 |
| Example 31 | | | | | | | | 1 |
| Example 32 | | | | 5 | | | | 0.75 |
| Example 33 | | | | | | | | 0.75 |
| Example 34 | | | | | | | | 0.75 |
| Example 35 | | | | | | | | 0.75 |

TABLE 2

| | Composition of peeling layer (mass %) | | | | | | | | | | |
|---|---|---|---|---|---|---|---|---|---|---|---|
| | Vinyl chloride-vinyl acetate | Polyester | (Meth) acrylic | AEa (m = 25, n = 8) | AEb (m = 25, n = 32) | AEc (m = 33, n = 3) | AEd (m = 33, n = 10) | AEe (m = 33, n = 42) | AEf (m = 33, n = 94) | AEg (m = 40, n = 3) | AEh (m = 40, n = 13) |
| Comparative example 1 | 70 | | | | | | | | | | |
| Comparative example 2 | 85 | | | | | | | | | | |
| Comparative example 3 | 85 | | | | | | | | | | |
| Comparative example 4 | | 70 | | | | 30 | | | | | |
| Comparative example 5 | | 85 | | | | 15 | | | | | |
| Comparative example 6 | | 95 | | | | 5 | | | | | |
| Comparative example 7 | | | | | | 30 | | | | | |

TABLE 2-continued

| | |
|---|---|
| Comparative example 8 | 15 |
| Comparative example 9 | 5 |

| | Composition of peeling layer (mass %) | | | | | | | Thickness |
|---|---|---|---|---|---|---|---|---|
| | AEi (m = 50, n = 4) | AEj (m = 50, n = 16) | Alcohol a (number of carbons 20) | Alcohol b (number of carbons 40) | Alcohol c (number of carbons 60) | Alcohol d (number of carbons 16) | Glyceryl mono-stearate | of peeling layer (μm) |
| Comparative example 1 | | | | | | | 30 | 0.75 |
| Comparative example 2 | | | | | | | 15 | 0.75 |
| Comparative example 3 | | | | | | 15 | | 0.75 |
| Comparative example 4 | | | | | | | | 0.75 |
| Comparative example 5 | | | | | | | | 0.75 |
| Comparative example 6 | | | | | | | | 0.75 |
| Comparative example 7 | | | | | | | | 0.75 |
| Comparative example 8 | | | | | | | | 0.75 |
| Comparative example 9 | | | | | | | | 0.75 |

Evaluation of Hot Peeling Strength

The thermal transfer sheet formed in each of the examples and comparative examples was adhered closely to a PVC card (manufactured by Dai Nippon Printing Co., Ltd., 5 cm in width×7 cm in length) serving as a transfer-receiving article using the following test printer, thus forming a laminate in which a surface of the thermal transfer sheet on the transfer layer side was adhered closely to the transfer-receiving article.

Test Printer

Thermal head: manufactured by Kyocera Corporation, KEE-57-12GAN2-STA

Average resistance of heating element: 3303Ω

Resolution in the main scanning direction: 300 dpi (dot per inch)

Resolution in the sub-scanning direction: 300 dpi

Line speed: 3.0 ms/line

Print initial temperature: 35° C.

Pulse duty ratio: 70%

Print image: solid image (0/255 gradation value)

A peel tester (manufactured by Kyowa Interface Science Co., Ltd., VPA-3) was prepared. The laminate (5 cm in width) was placed on a stage of the peel tester such that the transfer-receiving article side was in contact with the stage. The peel tester was set as described below and was allowed to stand for 3 minutes.

Peel Tester Conditions

Peel angle: 90 degrees

Stage temperature: 50° C.

The substrate of the thermal transfer sheet was then separated to measure the peeling strength. The peel interface was between the substrate and the peeling layer. The measured peeling strength was evaluated based on the following evaluation criteria. Table 3 shows the evaluation results.

Evaluation Criteria

A: The peeling strength was less than 1 N.

B: The peeling strength was 1 N or more and less than 2.5 N.

NG-1: The peeling strength was 2.5 N or more and less than 4 N.

NG-2: The peeling strength was 4 N or more or could not be measured due to breakage.

Evaluation of Cold peeling Strength

The transfer layer side of the thermal transfer sheet formed in each of the examples and comparative examples was adhered closely to a PVC card (manufactured by Dai Nippon Printing Co., Ltd., 5 cm in width×7 cm in length) serving as a transfer-receiving article using the following test printer, thus forming a laminate.

Test Printer

Thermal head: manufactured by Kyocera Corporation, KEE-57-12GAN2-STA

Average resistance of heating element: 3303Ω

Resolution in the main scanning direction: 300 dpi

Resolution in the sub-scanning direction: 300 dpi

Line speed: 3.0 ms/line

Print initial temperature: 35° C.

Pulse duty ratio: 70%

Print image: solid image (0/255 gradation value)

The laminate was allowed to stand at 22.5° C. and at a relative humidity of 50% for 1 hour.

The laminate (5 cm in width) after standing was placed on the stage of the peel tester such that the transfer-receiving article side was in contact with the stage. The peel tester was set as described below and was allowed to stand for 3 minutes.

Peel Tester Conditions

Peel angle: 90 degrees

Stage temperature: 25° C.

The substrate of the thermal transfer sheet was then separated to measure the peeling strength. The peeling interface was between the substrate and the peeling layer. The measured peeling strength was evaluated based on the following evaluation criteria. Table 3 shows the evaluation results.

Evaluation Criteria

A: The peeling strength was less than 1 N.

B: The peeling strength was 1 N or more and less than 2.5 N.

NG-1: The peeling strength was 2.5 N or more and less than 4 N.

NG-2: The peeling strength was 4 N or more or could not be measured due to breakage.

Evaluation of Adhesion to Substrate

An adhesive tape (manufactured by 3M Japan Limited, Scotch (registered trademark) super transparent tape) was adhered to the transfer layer of the thermal transfer sheet formed in each of the examples and comparative examples, and a 180-degree peel test was performed in accordance with JIS K 6854-2 (published in 1999).

After peeling, the adhesive tape was visually observed and was evaluated based on the following evaluation criteria.

Table 2 shows the evaluation results.

Evaluation Criteria

A: No adhesion of the transfer layer to the adhesive tape was observed.

B: Adhesion of the transfer layer was observed in less than 10% of the area of the adhesive tape.

C: Adhesion of the transfer layer was observed in 10% or more and less than 50% of the area of the adhesive tape.

D: Adhesion of the transfer layer was observed in about 50% or more of the area of the adhesive tape.

Evaluation of Thin Line Printability

Figure 8:
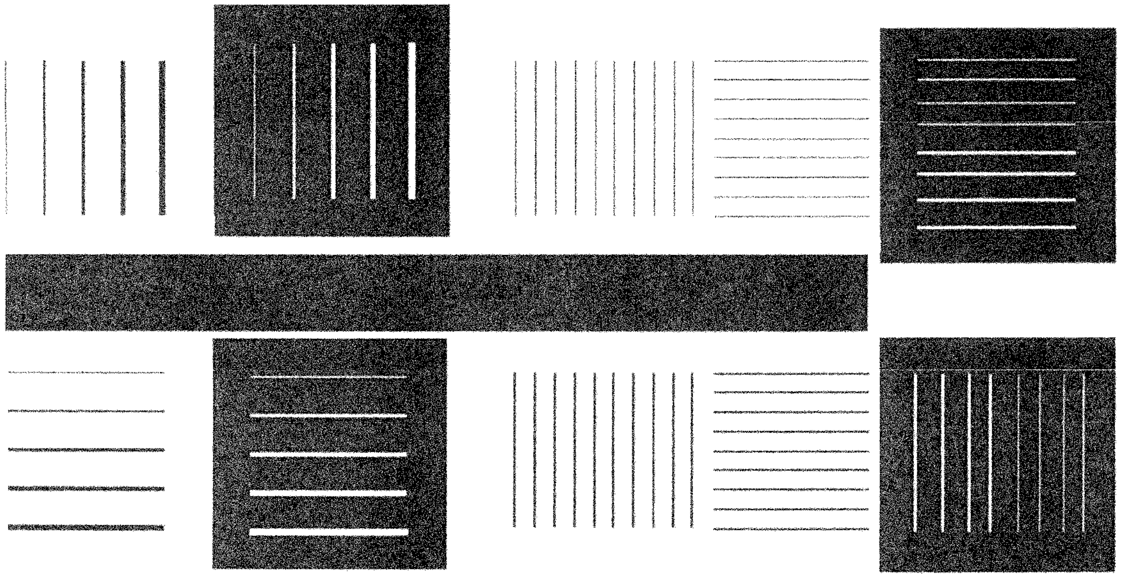
FIG. 8 is a front view of an image formed on a transfer-receiving article in thin line printability evaluation in the Examples.

The transfer layer of the thermal transfer sheet formed in each of the examples and comparative examples was transferred onto a transfer layer of a genuine intermediate transfer medium manufactured by HID (model number: 084053, product name: HDP Retransfer Film for HDP5000/HDPii-1500 Images) to form an image including 1-dot, 2-dot, and 3-dot thin lines (see FIG. 8). A card printer (HDP5000, manufactured by HID) was used for the transfer.

The transfer layer and the transfer layer of the intermediate transfer medium were then transferred onto the PVC card with the printer.

Printer Conditions

Transfer to intermediate transfer medium: default value
Retransfer temperature: 175° C.
Retransfer speed: 2.0 seconds/inch The formed image was visually observed and was evaluated based on the following evaluation criteria. Table 3 shows the evaluation results.

Evaluation Criteria

A: No collapsed or faint lines were observed in any of the 1-dot, 2-dot, and 3-dot thin lines.

B: Although no collapsed or faint lines were observed in the 2-dot and 3-dot thin lines, collapsed and faint lines were observed in the 1-dot thin lines.

C: Although no collapsed or faint lines were observed in the 3-dot thin lines, collapsed and faint lines were observed in the 1-dot and 2-dot thin lines.

D: Collapsed and faint lines were observed in the 1-dot, 2-dot, and 3-dot thin lines.

Evaluation of Retransferability

The transfer layer of the thermal transfer sheet formed in each of the examples and comparative examples was transferred onto the transfer layer of the genuine intermediate transfer medium manufactured by HID (model number: 084053, product name: HDP Retransfer Film for HDP5000/HDPii-1500 Images) to form a solid image. The card printer (HDP5000, manufactured by HID) was used for the transfer.

The transfer layer and the transfer layer of the intermediate transfer medium were then transferred onto the PVC card with the printer.

Printer Conditions

Transfer to intermediate transfer medium: default value
Retransfer temperature: 160° C.
Retransfer speed: 2.0 seconds/inch The transfer rates of the transfer layer of the thermal transfer sheet and the transfer layer of the intermediate transfer medium transferred onto the PVC card were measured and evaluated based on the following evaluation criteria. Table 3 shows the evaluation results.

Evaluation Criteria

A: The transfer rate was 95% or more.
B: The transfer rate was 80% or more and less than 95%.
C: The transfer rate was 50% or more and less than 80%.
D: The transfer rate was less than 50%.

The transfer rate was measured by the following method.

First, a PVC card to which the transfer layer of the thermal transfer sheet and the transfer layer of the intermediate transfer medium were transferred was digitized with a flatbed scanner (manufactured by Seiko Epson Corporation, GT-X830) under the following conditions.

Digitization Conditions

Resolution: 600 dpi
256 gray scale

The digital image was binarized with image analysis software ImageJ (National Institutes of Health, USA) to calculate the area of a dark portion.

The calculated area of the dark portion was substituted into the following formula to calculate the transfer rate.

$$\text{Transfer rate}(\%) = (\text{total area} - \text{area of dark portion})/\text{total area} \times 100$$

Evaluation of Durability

The transfer layer of the thermal transfer sheet formed in each of the examples and comparative examples was transferred onto the transfer layer of the genuine intermediate transfer medium manufactured by HID (model number: 084053, product name: HDP Retransfer Film for HDP5000/HDPii-1500 Images) to form a solid image. The card printer (HDP5000, manufactured by HID) was used for the transfer.

The transfer layer and the transfer layer of the intermediate transfer medium were then transferred onto the PVC card with the printer to form a printed material.

Printer Conditions

Transfer to intermediate transfer medium: default value
Retransfer temperature: 175° C.
Retransfer speed: 2.0 seconds/inch The density of the image on the printed material was measured with a reflection densitometer (RD-918, X-Rite).

The formed printed material was then subjected to a Taber test (load 500 gf, 60 cycles/min) with a Taber tester (abrasive wheel CS-10F) in accordance with ANSI-INCITS322-2002, 5.9 Surface Abrasion.

Every 50 cycles, the density of the image was measured as described above, and the number of cycles when the image density decreased by 30% was determined. The number of cycles thus determined was evaluated based on the following evaluation criteria. Table 3 shows the evaluation results.

Evaluation Criteria

A: 750 cycles or more
B: 500 cycles or more and less than 750 cycles
C: 250 cycles or more and less than 500 cycles
D: Less than 250 cycles

TABLE 3

| | Evaluation of hot peeling strength | Evaluation of cold peeling strength | Evaluation of adhesion to substrate | Evaluation of thin line printability | Evaluation of retransferability | Evaluation of durability |
|---|---|---|---|---|---|---|
| Example 1 | A | A | C | B | C | C |
| Example 2 | A | A | C | B | C | C |
| Example 3 | A | A | C | A | C | C |
| Example 4 | A | A | C | B | C | C |
| Example 5 | A | A | C | B | C | C |
| Example 6 | A | A | C | B | C | C |
| Example 7 | A | A | C | A | C | C |
| Example 8 | A | A | C | B | C | C |
| Example 9 | A | A | C | A | C | C |
| Example 10 | A | A | C | B | C | C |
| Example 11 | A | A | C | A | C | C |
| Example 12 | A | A | A | A | B | B |
| Example 13 | A | A | A | A | B | B |
| Example 14 | A | A | A | A | B | B |
| Example 15 | A | A | A | A | B | B |
| Example 16 | A | A | A | B | A | A |
| Example 17 | A | A | A | B | A | A |
| Example 18 | A | A | A | B | A | A |
| Example 19 | A | A | A | B | A | A |
| Example 20 | A | A | A | B | A | A |
| Example 21 | B | B | A | B | A | A |
| Example 22 | A | A | A | B | A | A |
| Example 23 | A | A | A | B | A | A |
| Example 24 | A | A | A | B | A | A |
| Example 25 | A | A | A | B | A | A |
| Example 26 | B | B | A | B | A | A |
| Example 27 | B | B | A | C | A | A |
| Example 28 | A | B | A | A | B | B |
| Example 29 | A | B | A | A | B | B |
| Example 30 | A | B | A | B | A | A |
| Example 31 | A | A | B | A | B | B |
| Example 32 | A | A | A | B | A | A |
| Example 33 | A | A | B | B | A | A |
| Example 34 | A | A | A | A | A | B |
| Example 35 | A | A | A | B | A | A |
| Comparative example 1 | NG-1 | NG-1 | C | D | B | D |
| Comparative example 2 | NG-1 | NG-1 | B | D | B | C |
| Comparative example 3 | NG-1 | NG-2 | A | C | A | A |
| Comparative example 4 | B | NG-2 | A | D | A | A |
| Comparative example 5 | B | NG-2 | A | D | A | A |
| Comparative example 6 | B | NG-2 | A | D | A | A |
| Comparative example 7 | B | NG-1 | D | C | D | C |

TABLE 3-continued

| | Evaluation of hot peeling strength | Evaluation of cold peeling strength | Evaluation of adhesion to substrate | Evaluation of thin line printability | Evaluation of retransferability | Evaluation of durability |
|---|---|---|---|---|---|---|
| Comparative example 8 | B | NG-1 | D | C | D | C |
| Comparative example 9 | B | NG-1 | D | C | D | C |

Embodiments of the thermal transfer sheet according to the present disclosure are described below. The thermal transfer sheet according to the present disclosure is not limited to these embodiments.

A thermal transfer sheet according to the present disclosure includes a substrate and a transfer layer, wherein the transfer layer includes at least a peeling layer, and the peeling layer contains a vinyl resin and at least one of an alcohol alkoxylate and an alcohol having 18 to 80 carbon atoms.

In one embodiment, the vinyl resin is a vinyl chloride-vinyl acetate copolymer.

In one embodiment, the peeling layer contains the alcohol alkoxylate, and the alcohol alkoxylate is an alcohol ethoxylate or an alcohol butoxylate.

In one embodiment, the alcohol alkoxylate is an alcohol ethoxylate and is represented by the following general formula (1):

$$C_mH_{2m+1}—O—(CH_2CH_2O)_n—H \quad (1)$$

wherein m denotes an integer in the range of 20 to 60, n denotes an integer in the range of 2 to 100, and n/m is 3.0 or less.

In one embodiment, the amount of alcohol alkoxylate in the peeling layer ranges from 1% to 45% by mass.

In one embodiment, the peeling layer contains an alcohol having 18 to 80 carbon atoms, and the alcohol having 18 to 80 carbon atoms is a linear aliphatic alcohol.

In one embodiment, the amount of the alcohol having 18 to 80 carbon atoms in the peeling layer ranges from 1% to 45% by mass.

In one embodiment, the ratio of the amount of vinyl resin in the peeling layer to the sum of the amount of alcohol alkoxylate and the amount of alcohol having 18 to 80 carbon atoms in the peeling layer ranges from 60/40 to 99.5/0.5 based on mass.

REFERENCE SIGNS LIST

10 thermal transfer sheet, 11 substrate, 12 peeling layer, 13 transfer layer, 14 coloring layer, 15 protective layer, 16 adhesive layer, 17 receiving layer, 18 back layer

The invention claimed is:

1. A thermal transfer sheet comprising:

a substrate; and a transfer layer, wherein the transfer layer comprises at least a peeling layer that is separable from the substrate, wherein the peeling layer contains a vinyl resin, an alcohol butoxylate and an alcohol alkoxylate as represented by the following general formula (1):

$$C_mH_{2m+1}—O—(CH_2CH_2O)_n—H \quad (1)$$

wherein m denotes an integer in the range of 25 to 60, n denotes an integer in the range of 2 to 100, and n/m is 3.0 or less.

2. The thermal transfer sheet according to claim 1, wherein the vinyl resin is a vinyl chloride-vinyl acetate copolymer.

3. The thermal transfer sheet according to claim 1, wherein an amount of all alcohol alkoxylates in the peeling layer ranges from 1% to 45% by mass.

4. The thermal transfer sheet according to claim 1, wherein the peeling layer further contains an alcohol having 18 to 80 carbon atoms.

5. The thermal transfer sheet according to claim 4, wherein a ratio of an amount of the vinyl resin in the peeling layer to a sum of an amount of all alcohol alkoxylates and an amount of the alcohol having 18 to 80 carbon atoms in the peeling layer ranges from 60/40 to 99.5/0.5 based on mass.

6. A thermal transfer sheet comprising:

a substrate; and a transfer layer, wherein the transfer layer comprises at least a peeling layer that is separable from the substrate, wherein the peeling layer contains a vinyl resin and an alcohol having 18 to 80 carbon atoms, wherein an amount of the alcohol having 18 to 80 carbon atoms in the peeling layer ranges from 2% to 30% by mass, wherein the vinyl resin is a vinyl chloride-vinyl acetate copolymer, and wherein the peeling layer further contains an alcohol alkoxylate as represented by the following general formula (1):

$$C_mH_{2m+1}—O—(CH_2CH_2O)_n—H \quad (1)$$

wherein m denotes an integer in the range of 25 to 60, n denotes an integer in the range of 2 to 100, and n/m is 3.0 or less.

7. The thermal transfer sheet according to claim 6, wherein the peeling layer further contains an alcohol butoxylate.

8. The thermal transfer sheet according to claim 6, wherein the alcohol having 18 to 80 carbon atoms is a linear aliphatic alcohol.

9. The thermal transfer sheet according to claim 6, wherein a ratio of an amount of the vinyl resin in the peeling layer to a sum of an amount of the alcohol alkoxylate as represented by the general formula (1) and an amount of the alcohol having 18 to 80 carbon atoms in the peeling layer ranges from 60/40 to 99.5/0.5 based on mass.

* * * * *